No. 674,863. Patented May 28, 1901.
J. F. GAY-LORD.
NON-REFILLABLE BOTTLE.
(Application filed Dec. 27, 1900.)
(No Model.)
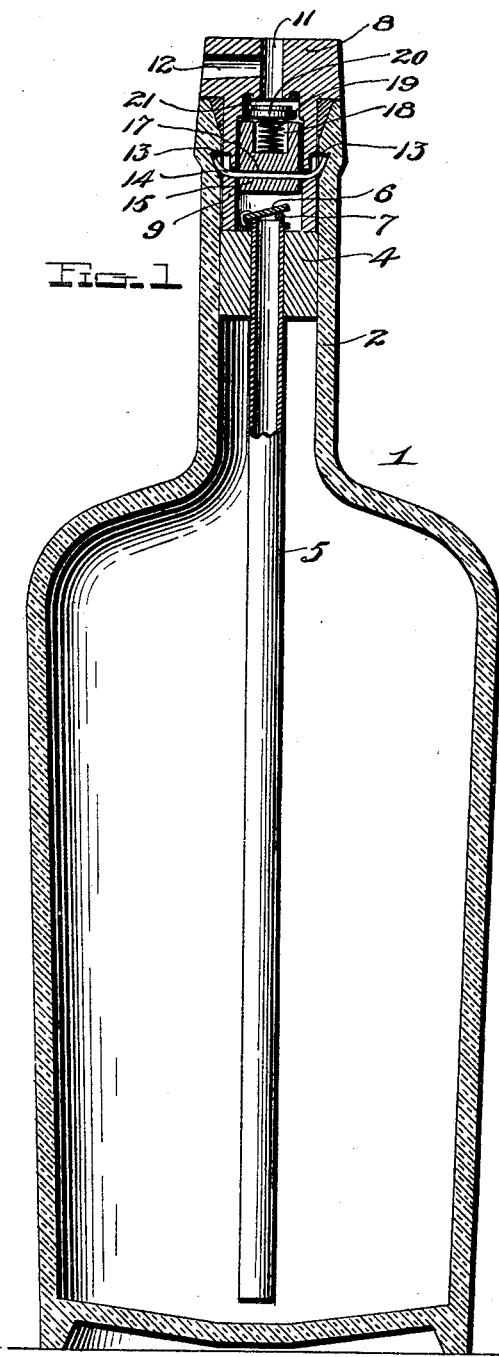
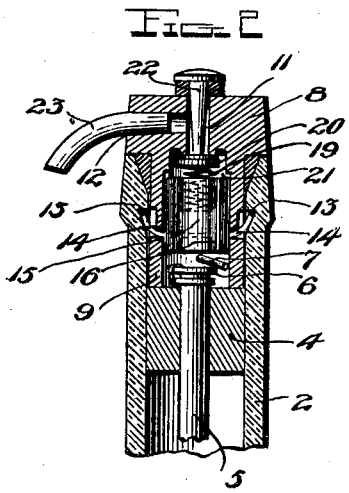
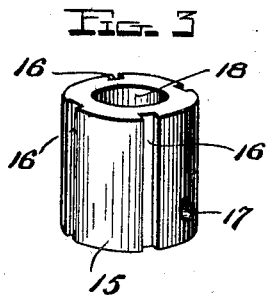
Witnesses
Inventor
John F. Gay-Lord

UNITED STATES PATENT OFFICE.

JOHN F. GAY-LORD, OF BALTIMORE, MARYLAND, ASSIGNOR TO SIERRA L. RICHARDS, OF SAME PLACE.

NON-REFILLABLE BOTTLE.

SPECIFICATION forming part of Letters Patent No. 674,863, dated May 28, 1901.

Application filed December 27, 1900. Serial No. 41,224. (No model.)

*To all whom it may concern:*

Be it known that I, JOHN F. GAY-LORD, a citizen of the United States, residing at Baltimore, in the State of Maryland, have invented certain new and useful Improvements in Non-Refillable Bottles; and I do declare the following to be a full, clear, and exact description of the invention, such as will enable others skilled in the art to which it appertains to make and use the same.

The invention relates to non-refillable bottles.

The object of the invention is to provide a vessel of this character which shall be simple of construction and comparatively inexpensive of production and which after once having been filled and its contents decanted cannot possibly be refilled, thus protecting the public against unscrupulous persons who frequently refill vessels bearing the trade-mark or label of some well-known liquid with a liquid of inferior quality and sell it to the trade, representing it to be the genuine liquid.

With this and other minor objects in view the invention consists of certain novel features of construction, combination, and arrangement of parts, which will be hereinafter more fully described, and particularly pointed out in the appended claims.

In the accompanying drawings, Figure 1 is a vertical sectional view through a bottle, illustrating the application of my invention, the parts of the stopper being shown in the position they occupy when the bottle is being filled. Fig. 2 is a similar view of the neck of the vessel only, showing the tube-valve closed and the parts in position to use in decanting. Fig. 3 is a detail perspective view of the baffle-plug.

Referring now more particularly to the drawings, the numeral 1 denotes a vessel which in the present instance is shown as a bottle provided with a neck 2.

4 denotes a stopper fitted in the neck below its outlet, and 5 denotes a tube extending through said stopper and having its lower end projecting within the bottle at a point adjacent to its bottom.

6 denotes an upwardly-opening and downwardly-closing valve, which may be of any well-known construction, but which in the present instance is shown as consisting of a flat valve arranged in position to close the upper end of the tube.

7 denotes a device for holding the valve open in the act of filling the bottle through the tube 5. This device in the present instance is shown as a pin, which is preferably made from material of less specific gravity than the liquid—as, for instance, of wood— so that in decanting from said bottle through said tube the device will be floated away from under the valve and permit said valve to close down upon the upper end of the tube and prevent the introduction of liquid into the bottle through said tube.

8 denotes a stopper which fits over the upper end of the neck and has a tubular extension 9, which projects within the neck. This stopper is provided with a vertical passage or duct 11, which is intersected by a horizontal passage 12 and is secured inseparably to the neck in any suitable manner. A simple way is to form the neck of the bottle with an annular internal shoulder 13 and provide the stopper with a spring-lock 14, which will have its ends compressed in the insertion of the stopper into the neck, and the instant the ends pass below the shoulders said ends will spring out and engage the shoulders, and thereby prevent the withdrawal of the stopper.

15 denotes a baffle-plug having grooves 16 in its periphery to permit of the passage of liquid into and from the bottle. This baffle-plug is preferably held in place by the spring-lock 14, which passes through the transverse aperture 17, formed in the baffle-plug. The upper end of the plug is formed with a spring-seat 18, in which is placed a spring 19, supporting a valve 20, located in a chamber 21 and designed to close the duct 11. The diameter of the valve is less than that of the chamber, so as to leave an intervening space for the passage of the liquid.

22 denotes a push-pin for unseating the valve 20 against action of the spring, and 23 denotes a discharge-nozzle. The push-pin and discharge-nozzle may be removable and may be attached by the person when it is desired to decant the contents of the bottle.

To fill the bottle after the stoppers have been secured in place, with the valve 6 held in its open position by the pin 7, the pin 22 and nozzle 23 are removed and the duct 12 closed by the finger, if desired. In this position communication is established with the duct 11, and the liquid from the filling vessel is forced into the bottle through the duct 11 under pressure. The liquid passing through the duct 11 forces the valve 20 downwardly from its seat, then flows around the periphery of said valve down the grooves in the baffle-plug, under the valve 6, which is in the position shown in Fig. 1, into the tube 5, and then discharges from the lower end of the tube into the bottle. As the liquid rises in the bottle the air therein, not being able to escape therefrom, is compressed in the neck of the bottle. After the bottle has been filled it is removed from the source of supply, and the instant pressure is removed from the valve 20 it will reseat itself, thus preventing the escape of liquid.

When it is desired to decant the contents of the bottle, the pin 22 and nozzle 23 are placed in position, and by depressing the nozzle the valve 20 will be unseated, thus allowing the compressed air to force the liquid up through the tube 5, lifting the valve 6 from its seat and liberating the locking device 7 and permitting the liquid to be forced out through the nozzle 23 in the manner similar to the decanting of carbonated beverages from siphon-bottles. As soon as the desired amount has been discharged from the bottle pressure is removed from the pin 22, thus allowing the valves 6 and 20 to reseat themselves and the parts to assume the position shown in Fig. 2. In this position the bottle cannot be refilled in the manner set forth in the initial filling of the bottle, for the reason that the device 7 has freed itself from lifting engagement with the valve 6, and any tendency to force the liquid into the bottle under pressure will serve to more tightly bind or close the valve 6 against the upper end of the tube 5. It will be impossible to lift this valve 6 from its seat by the introduction of any tool or wire from without, the baffle-plug being so positioned or arranged as to defeat such an attempt.

From the foregoing description, taken in connection with the accompanying drawings, the construction and mode of operation of my improved non-refillable bottle will be readily understood without requiring a more extended explanation.

Various changes in the form, proportion, and minor details of construction may be made within the scope of the invention without departing from the spirit or sacrificing any of the advantages thereof.

Having thus described my invention, what I claim, and desire to secure by Letters Patent, is—

1. The combination of a vessel having a stopper, a tube extending downwardly from the stopper to a point adjacent to the bottom of the vessel and an outwardly-opening valve at the discharge end of said tube, means for holding the valve open in the filling of the vessel through said tube, said means being movable from said valve in the initial decanting of the liquid through said tube to permit of the subsequent closing of the valve and thereby preventing the introduction of the liquid into the vessel through said tube, but permitting of its subsequent discharge therefrom under the action of compressed air within the vessel, and means for controlling the outlet from said vessel, said means being inseparably connected with said vessel, substantially as set forth.

2. The combination of a vessel having a stopper, a tube extending downwardly from the stopper to a point adjacent to the bottom of the vessel and an outwardly-opening valve at the discharge end of said tube, means for holding the valve open in the filling of the vessel through said tube, said means being movable from said valve in the initial decanting of the liquid through said tube to permit of the subsequent closing of the valve and thereby preventing the introduction of the liquid into the vessel through said tube, but permitting of its subsequent discharge therefrom under the action of compressed air within the vessel, means for controlling the outlet from said vessel, said means being inseparably connected with said vessel, and a baffle device located above said valve, substantially as set forth.

3. The combination of a vessel having a stopper, a tube extending downwardly from the stopper to a point adjacent to the bottom of the vessel, an outwardly-opening valve for the upper end of said tube, a device interposed between the upper end of said tube and said valve and movable from its position between the two in the initial decanting of the liquid through said tube to permit of the subsequent closing of the valve and thereby preventing the introduction of liquid into the vessel through said tube, but permitting of its discharge therefrom under the action of compressed air within the vessel, and means for controlling the outlet from said vessel, said means being inseparably connected with the vessel.

4. The combination of a vessel having a stopper, a tube extending downwardly from the stopper to a point adjacent to the bottom of the vessel, an outwardly-opening valve for the upper end of said tube, a device interposed between the upper end of said tube and said valve, said device being of less specific gravity than the liquid within said vessel, and movable from its position between the two in the initial decanting of the liquid through said tube to permit of the subsequent closing of the valve and thereby preventing the introduction of liquid into the vessel through said tube, but permitting of its discharge therefrom under the action of compressed air within the vessel, and means for controlling the outlet from said vessel, said means being inseparably connected with the vessel, substantially as set forth.

5. The combination of a vessel having two stoppers in its mouth, one located above the other, a valve for normally closing the outlet to the upper stopper, a tube extending downwardly from the lower stopper to a point adjacent to the bottom of the vessel, an upwardly-opening valve in the upper end of said tube, means for holding the valve open in the filling of the vessel through said tube, said means being movable from said valve in the initial decanting of the liquid through said tube to permit of subsequent closing of the valve and thereby preventing the introduction of liquid into the vessel through said tube but permitting of its subsequent discharge therefrom under the action of compressed air within the vessel, means for unseating the first-named valve, substantially as set forth.

6. The combination of a vessel having two stoppers in its mouth, one located above the other, a valve for normally closing the outlet to the upper stopper, a tube extending downwardly from the lower stopper to a point adjacent to the bottom of the vessel, an upwardly-opening valve in the upper end of said tube, a baffle device interposed between the two valves, means for holding the valve open in the filling of the vessel through said tube, said means being movable from said valve in the initial decanting of the liquid through said tube to permit of subsequent closing of the valve and thereby preventing the introduction of liquid into the vessel through said tube but permitting of its subsequent discharge therefrom under the action of compressed air within the vessel and means for unseating the first-named valve, substantially as set forth.

In testimony whereof I have hereunto set my hand in presence of two subscribing witnesses.

JOHN F. GAY-LORD.

Witnesses:
JAMES A. G. KOEHL,
BENJ. G. COWL.